United States Patent [19]

Weinstein

[11] Patent Number: 4,946,905
[45] Date of Patent: Aug. 7, 1990

[54] PREPARATION OF AGE-RESISTING POLYMERS BY REACTIONS INVOLVING USE OF AMINOMERCAPTANS

[75] Inventor: Arthur H. Weinstein, Hudson, Ohio

[73] Assignee: The Goodyear Tire & Rubber Company, Akron, Ohio

[21] Appl. No.: 156,493

[22] Filed: Feb. 16, 1988

Related U.S. Application Data

[63] Continuation of Ser. No. 471,076, Mar. 1, 1983, Pat. No. 4,760,181, which is a continuation of Ser. No. 286,494, Jul. 24, 1981, abandoned, which is a continuation of Ser. No. 144,153, Apr. 28, 1980, abandoned, which is a continuation of Ser. No. 50,021, Jun. 18, 1979, abandoned, which is a continuation of Ser. No. 845,001, Oct. 25, 1977, abandoned, which is a continuation-in-part of Ser. No. 712,551, Aug. 9, 1976, abandoned.

[51] Int. Cl.$^5$ .............................................. C08C 19/22
[52] U.S. Cl. .................. 525/350; 525/332.9; 525/333.1; 525/333.2
[58] Field of Search ............................. 525/351, 350

[56] References Cited

U.S. PATENT DOCUMENTS

| | | | |
|---|---|---|---|
| 2,614,095 | 10/1952 | Shelley | 524/225 |
| 3,035,014 | 5/1962 | Popoff et al. | 524/236 |
| 3,038,896 | 6/1962 | Habicht et al. | 540/587 |
| 3,217,038 | 11/1965 | Guarnaccio et al. | 564/440 X |
| 3,282,903 | 11/1966 | Tocker | 525/350 |
| 3,293,297 | 12/1966 | Louvar et al. | 564/440 X |
| 3,624,046 | 11/1971 | Charle et al. | 564/192 X |
| 3,975,414 | 8/1976 | Kline | 564/192 X |
| 4,055,599 | 10/1977 | Huber-Emden et al. | 564/192 X |

FOREIGN PATENT DOCUMENTS

| | | |
|---|---|---|
| 743409 | 6/1970 | Belgium . |
| 1595383 | 2/1965 | Fed. Rep. of Germany . |
| 1910177 | 9/1970 | Fed. Rep. of Germany . |
| 2089038 | 12/1971 | France . |
| 1441621 | 7/1976 | United Kingdom . |

OTHER PUBLICATIONS

Ceausescu, E. et al., J. Macromol. Sci. Chem., A22 (5-7), pp. 525-539 (1985).
Scott, G. et al., Polym. Deg. and Stab. 5(1983), pp. 11-22.
Scott, G. et al., Polym. Deg. and Stab. 5(1983), pp. 1-10.
Kaibab, A. A. et al., Polym. Deg. and Stab. 3(1981), pp. 221-227.

*Primary Examiner*—Christopher Henderson
*Attorney, Agent, or Firm*—Alvin T. Rockhill

[57] ABSTRACT

This invention relates to polymers which contain amino-sulfide age-resistant groups, and their preparation by reaction of aminomercaptans.

9 Claims, No Drawings

PREPARATION OF AGE-RESISTING POLYMERS BY REACTIONS INVOLVING USE OF AMINOMERCAPTANS

This is a Continuation of application Ser. No. 471,076 filed on Mar. 1, 1983 (now issued as U.S. Pat. No. 4,760,181) which is a continuation of prior application Ser. No. 286,494 filed on Jul. 24, 1981 now abandoned, which is a continuation of prior application Ser. No. 144,153 filed on Apr. 28, 1980 now abandoned, which is a continuation of prior application Ser. No. 050,021 filed on Jun. 18, 1979 now abandoned, which is a continuation of prior application Ser. No. 845,001 filed on Oct. 25, 1977 now abandoned which is a continuation-in-part of prior application Ser. No. 712,551 filed on Aug. 9, 1976 now abandoned.

PRIOR ART

Kline U.S. Pat. No. 3,658,769 discloses polymers containing relatively low levels of certain N,N'-disubstituted p-phenylenediamine units chemically bound to polymers as substituents of acrylic monomer units present in them, which units have resistance to aging at elevated temperatures. This resistance is not possessed by similar polymers not containing such substituents. The age-resisting functions are introduced into the polymers by copolymerization of acrylic monomers containing such functions with vinyl or dienic monomers to prepare the polymer system.

A review article by Meyer, Tewksbury and Pierson in HIGH POLYMERS, Vol. XIX, E. M. Fetles, Ed., Interscience, New York, 1964, Chapter 2, discloses the incorporation of aliphatic mercaptans into polydienes to varying degrees by many workers and that the reaction involved was addition of the mercaptan to a polymeric double bond. The degrees to which the resultant adducted polymers differed in properties from the polymeric reactants depended on the degree of interaction.

THE INVENTION

This invention relates to polymers self-resistant to aging which contain N,N'-disubstituted-p-phenylenediamine groups bound to the respective polymers by monosulfide linkages. It also relates to methods of preparing such compositions by interactions of certain aminomercaptans which are N,N'-disubstituted p-phenylene diamines, each containing a mercapto alkyl function, either with a polymer radical during the course of a free-radical polymerization, or with a polymer containing at least one olefin unit per molecule in a post-polymerization addition reaction. Aminomercaptans which are useful in the process are discussed under the heading The Aminomercaptans.

It is well known that certain N,N'-disubstituted p-phenylene diamine derivatives, when used at relatively low weight levels, as additives to certain oxidizable oils, fats or polymers, greatly enhance the resistance to aging or to oxidation of these materials. Hence, by incorporating a compound containing such a diamine substituent into a polymer by means of a chemical bond, one makes such a polymer intrinsically resistant to aging. Such age resistance cannot be removed from the polymer by extraction, sublimation, decantation, filtration or by other physical process by which conventional antioxidant additives can be removed from polymers.

According to the present invention, an aminoantioxidant function is incorporated into a polymer at relatively low levels by interaction of relatively low levels of a non-monomeric amino-substituted mercaptan either (a) as a chain transfer reagent reacting both with monomer and with growing polymer radicals during the course of a free radical polymerization or (b) in an addition process in which it reacts with a preformed polymer containing at least one double bond or (c) in a reaction with a polydiene homopolymer or copolymer during the course of milling and curing. All such interactions may be carried out either in emulsion, solution, dispersion, or bulk media.

The polymer compositions prepared by the processes of this invention are preferable to known similar polymer compositions not containing chemically bound age-resisters but protected by conventional age-resisters.

Hence polymers containing such chemically bound age-resister groups have a distinct advantage over polymers of similar structure but protected only by admixture with conventional age-resister compounds.

The polymers with built-in age-resistance are usually composed of segmers of conjugated diene monomers of 4 to 10 carbon atoms or non-conjugated cyclic or acyclic olefin monomers of 2 to 20 carbon atoms or vinyl monomers of 2 to 10 carbon atoms.

Examples of the products made from the new polymers with built-in age-resisters include rubber goods such as liners, gaskets, hoses and belts subjected to elevated temperatures and/or in contact with oils or solvents, and foam-rubber backings for carpets subjected to dry-cleaning, etc.

The products with built-in age resistance may be liquid or elastomeric solid. They may be elastomers or more resinous, depending upon the nature of the monomer used and the molecular weight, etc., and no limitation is placed on the molecular weight. Those which are elastomers may, when compounded with vulcanizing ingredients, be vulcanized and used wherever rubbers are employed. Some of these may be used as gums, when not vulcanized. Depending upon the nature of the polymer, it may be used for coatings for wood, fabrics, metals, etc., for caulkings, moldings, etc.

The amount of the age-resisting group united with the polymer is generally comparable to the amount of conventional antioxidant or antiozonant employed, being generally between 0.10 and 10 parts, and preferably 0.5 to 5 parts per 100 parts of the polymer. The amount may vary depending upon the particular aminomercaptan, the nature of the polymer, and the use to be made of the product. For instance, an installation in the tropics will require more than the same installation which is to be installed in a cold climate.

One process of the present invention involves a chain-transfer reaction, in which certain mercapto-alkyl derivatives of N,N'-disubstituted-p-phenylene diamines which have antioxidant properties interact with a polymerizing monomer system to produce polymers containing these diamino substituents interlinked with the polymer through a monosulfide bond. This is discussed below under the heading The Chain Transfer Reaction. The resultant polymer has an intrinsic age resistance. Such polymers may be produced by polymerizing any monomers or mixtures of monomers capable of homopolymerization, copolymerization or interpolymerization by free-radical mechanism in presence of such diamine derivatives. Such monomers include conjugated dienes containing 4 to 6 or more up to, for example, 10 carbon atoms, and halogen derivatives thereof, including butadiene-1,3-; 2-ethylbutadiene-1,2,3-dimethyl-butadiene-1,3; isoprene; piperylene; 1,3-hexadienes; 1,3-decadienes; and 2-chlorobutadiene; etc., and vinylic monomers containing 2 to 10 carbon atoms including styrene, alpha-methyl styrene, divinyl benzene, vinyl chloride, vinyl acetate, vinyl pyridine, vinylidene chloride, acrylonitrile, methacrylonitrile, ethyl acrylate, methyl methacrylate, acrylic acid, methacrylic acid, maleic acid, itaconic acid, and maleic anhydride, etc.

Another process of the present invention involves another free-radical reaction of a member of the same family of aminomercaptans with polymer substrates which contain at least one reactable double bond per polymer molecule. This is an addition reaction in which the aminomercaptan reacts with this double bond. This is discussed below under the heading The Free-Radical Addition Reaction.

Thus, any isotactic, syndiotactic or atactic homopolymer or copolymer which contains a double bond reactable with the operable aminomercaptans can be used as a substrate in carrying out this addition process.

A third process relates to interaction of any of the foregoing polydiene homo- and co-polymers with said aminomercaptans during the course of milling and curing in the presence of rubber chemicals including reinforcing agents and pigments, etc. Because the reaction takes place during milling and curing, the exact nature of the reaction is not clearly evident but a vulcanized product is obtained which is intrinsically age-resistant. This is further discussed under the heading Milling and Curing Process.

In this process, a small amount of the aminomercaptan is used, such as 0.10 to 5 parts, more or less. The temperature may vary widely. If the milling is conducted at a sufficiently high temperature, some or all of the reaction may be completed before curing. The curing operation will be employed at any usual temperature, and the time required will depend upon the polymer system, the temperature and the curing system.

THE AMINOMERCAPTANS

The aminomercaptans useful in producing the age-resisting polymers of this invention are defined by the following formula;

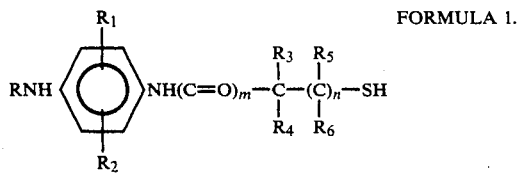

FORMULA 1.

which is sometimes referred to as ZSH. In this function R=a radical of the class consisting of (a) phenyl or phenyl which is substituted in any one or more positions with an alkyl or alkoxy group of 1 to 4 carbon atoms or with a radical of the formula

in which both $R_7$ and $R_8$ may be either an alkyl group of 1 to 4 carbon atoms or hydrogen; or (b) a cycloalkyl radical having from 5 to 12 carbon atoms; or (c) a branched acyclic group comprising a chain of 1 to 12 carbon atoms, and each carbon may be substituted with 1 or 2 alkyl groups of 1 to 3 carbon atoms; or (d) an alicyclic aralkyl or aryl radical having from 7 to 14 carbon atoms.

m=zero or 1
n=0 to 12
$R_1$, $R_2$, $R_3$, $R_4$, $R_5$ and $R_6$ are each selected from the group consisting of hydrogen and alkyl groups of 1 to 5 carbon atoms; and may be the same or different.

The aminomercaptan may be prepared by various methods. A p-phenylene diamine substituted at one nitrogen atom with the desired aryl or alkyl substituents, $RNH.C_6H_4.NH_2$, may be converted to an N-mercapto alkyl acyl derivative, $RNH.C_6H_4.NHC=O(CH_2)_nSH$ by direct amidation with a mercapto acid such as thioglycolic or beta-mercaptopropionic acid. Illustrations of such preparations are included as Example 1. N-Mercaptoalkyl derivatives of similarly substituted p-phenylene diamines (as illustrated in Formula 1 where m=zero) may be prepared from the latter by treatment with ethylene sulfide or propylene sulfide, or, in a two-step procedure involving treatment of an N-substituted phenylene diamine with a half mole equivalent of a dithio dialdehyde such as $\alpha$, $\alpha'$-dithioisobutyraldehyde to form a dithio diimine [a procedure described by J. J. D'Amico and W. E. Dahl, J. Org. Chem. 40, 1224 (1975)]; and subsequent reduction of the diamine to an aminomercaptan with lithium aluminum hydride in refluxing tetrahydrofuran [a procedure described by J. L. Corbin and D. E. Work, J. Org. Chem. 41, 489 (1976)] or some other reducing system. Such a procedure is illustrated by Example 3.

The method of preparing the aminomercaptans useful in this invention is not critical to the practice of this invention.

Representative amino-mercaptans which can be used in the present invention are listed below and the numbers refer to the numbers in Table I.

| NO. | NAME |
|---|---|
| I | N-(4-anilino-phenyl)-α-mercapto-acetamide |
| II | N-(4-anilino-phenyl)-βmercapto-propionamide |
|  | N-(4-anisidino-phenyl)- or N-(4-phenetidino-phenyl)-α-mercapto-acetamide |
| V | N-(4-anisidino-phenyl)-β-mercapto-propionamide |
|  | N-(2-toluidino-phenyl)-α-mercapto-acetamide |
| IV | N-(2-toluidino-phenyl)-β-mercapto-propionamide |
| III | N-(4-toluidino-phenyl)-α-mercapto-acetamide |
| VI | N-[4-(α',Y'-dimethyl-butylamino)-phenyl]-α-mercapto-acetamide |
| VII | N-[4-(α',Y'-dimethyl-butylamino)-phenyl]-β-mercapto-propionamide |
|  | N-(4-anisidino-phenyl)-mercapto-propionamide |
|  | N-(4-phenetidino-phenyl)-β-mercapto-propionamide |
|  | N-(4-cyclopentylamino-phenyl)-α-mercapto-acetamide |
|  | N-(4-cyclohexylamino-phenyl)-α-mercapto-acetamide |
|  | N-(4-cyclohexylamino-phenyl)-ω-mercapto-lauramide |
|  | N-(4-cyclooctylamino-phenyl)-ω-mercapto-caproamide |
|  | N-(4-cyclodecylamino-phenyl)-β-mercapto-isobutyramide |
|  | N-(4-cyclododecylamino-phenyl)-β-mercapto capramide |
|  | N[4-(α'-methyl-undecylamino)-3-isopropyl-6-methyl-phenyl]-α-mercapto-butyramide |
|  | N-(4-anilino-phenyl)-β-mercapto-β-β-dimethyl-butyramide |
|  | N-[α',Y'-benzylamino-phenyl]-β-mercapto-propionamide |
|  | N-[4-(α'-methyl-benzylamino-phenyl]-α-mercapto- |

-continued

| NO. | NAME |
|---|---|
| | acetamide |
| | N-[4-(α'-methyl-benzylamino)-phenyl]-β-propon-amide |
| | N-[4-(α'-ethyl-Y'-methyl-pentylamino)-phenyl]-α-mercapto-acetmide |
| | N-[4-α'-(ethyl-Y'-methyl-pentylamino)-phenyl]-β-propionamide |
| | N[4-dimethylamino-phenyl]-ω-mercapto-myristamide |
| | N-[4-diethylamino-phenyl]-α-mercapto-acetamide |
| | N-[4-di-n-butylamino-phenyl]-α-mercapto-propionamide |

Another amino mercaptan which is described in Example 3 as compound XIV is:

XIV N-(β-mercapto-β,β-dimethyl-ethyl), N'-phenyl-p-phenylenediamine

Other amino mercaptans include:

N-(β-mercapto-β,β-dimethyl-ethyl)N'-(4-di-n-butyl-phenyl)p-phenylene diamine
N-(δ-mercapto-butyl)-N'-phenyl-p-phenylene-diamine
N-(ω-mercapto-lauryl)-N'-phenyl-p-phenylene-diamine Other compounds include those in which m=o, corresponding to the many compounds listed above in which m=1.

Examples of diamine substrates suitable for preparation of amino-mercaptans useful in this invention, described and referred to by number in Table II, are:

VIII N-phenyl-p-phenylenediamine
X N-2'-tolyl-p-phenylenediamine
XIII bis-[β-(4-anilinophenyl-imino)-α,α-dimethylethyl] disulfide
N-4'-phenethyl-p-phenylenediamine
IX N-4'-tolyl-p-phenylenediamine
XI N-4'-anisyl-p-phenylenediamine
XII N-(α',α'-dimethyl-butyl)-p-phenylenediamine
N-(4'-dimethylamino-phenyl)-p-phenylenediamine The aminomercaptans may be used as antioxidants following conventional procedures.

Within the family of aminosulfide groups illustrated by ZS- group of Formula 1, there is a sub-family of amino groups having the essential structural features of certain diamines which are used commercially as anti-ozonants. These are those amino groups in which at least one of the nitrogen atoms of the para-phenylenediamine group is substituted by an alkyl group through a secondary or tertiary carbon atom (a condition of Formula 1 in which m=0, and at least either $R_3$ or $R_4$ is an alkyl group rather than hydrogen) and the other nitrogen atom of this diamine group is attached either to an alkyl, a phenyl, or substituted phenyl group, through a secondary or tertiary carbon atom (a carbon atom having no more than one hydrogen atom substituent). This sub-family of aminosulfide groups provides polymers to which these groups are attached with an appreciable degree of resistance to ozone cracking in addition to an enhanced resistance to attack by other forms of oxygen.

1. THE CHAIN TRANSFER REACTION

According to one reaction, a mercaptoalkyl derivative of an N,N'-disubstituted diamine is chemically incorporated into the polymer by a monosulfide bond by means of a chain transfer reaction. The steps of the reaction are represented by the following equations:

$$I\cdot + M \longleftrightarrow IM\cdot \qquad \text{EQUATION 1}$$

$$IM\cdot + nM \longleftrightarrow IM_{n+1}\cdot = P_x\cdot \qquad \text{EQUATION 2}$$

$$P_x\cdot + ZSH \longleftrightarrow P_xH + ZS\cdot \qquad \text{EQUATION 3}$$

$$ZS\cdot + M \longleftrightarrow ZSM\cdot \qquad \text{EQUATION 4}$$

$$ZSM\cdot + qM \longleftrightarrow ZSM_{q+1}\cdot = P_y\cdot \qquad \text{EQUATION 5}$$

$$P_y\cdot + ZSH \longleftrightarrow P_yH + ZS\cdot \qquad \text{EQUATION 6}$$

In these equations:
I· = the activating initiator radical
M = the reacting monomer (as defined earlier for the chain transfer process)
n and q = numbers of molecules of monomer reacting with initial monomer radical
$P_x\cdot$ represents the relatively small number of polymer radicals generated initially
$P_y\cdot$ represents the majority of polymer radicals formed, which are chemically bonded to an amino group through a sulfide linkage
ZSH = a member of the family of aminomercaptans used, in which the structure ZS is defined in further detail by the aminosulfide group illustrated in Formula 1.

An illustration of such a chain transfer reaction as a mode of incorporation of an aralkyl sulfide group into polymers is given in the study of the interaction of 2-mercaptomethyl naphthalene with a polystyrene radical, which is to be found in an article of Pierson, Costanza and Weinstein in J. POLYMER SCIENCE, 17, 221, (1955).

In the use of the chain transfer method of chemical incorporation of amino antioxidant functions into polymers, one or more monomers known to polymerize under free radical conditions may be polymerized in the presence of a low level of one of the amino mercaptans useful in this invention. The polymerizations may be carried out in emulsion, suspension, bulk or solution type systems. Some adjustments in the polymerization recipe and/or conditions are necessary to assure that a satisfactory rate of polymer formation and a desirable polymer molecular weight level are achieved. Among the parameters critical to achievement of the process are the level of aminomercaptan charge, which may have an effect on the degree of inhibition of polymerization as well as a very definite effect both on the level of age-resistor function incorporated into the polymer and on the average molecular weight of the resultant polymer. Other adjustments which may be required in order to achieve such goals are the choice of a free radical initiator system which does not pre-oxidize the amino-mercaptan into a substance which greatly retards or prevents polymerization, and the possible use of a solvent or diluent additive including use of a comonomer chosen to assure the solubility of the amino-mercaptan in the polymerization system. In emulsion systems, some solvents such as pyridine or toluene, or small amounts of such comonomers as styrene, acrylonitrile or acrylic esters can be used to advantage for the latter purpose.

Examples of free-radical initiator systems useful in the practice of the chain transfer process include those known as "redox" systems. An example is those initiators which employ a combination such as a chelated ferrous salt, sodium formaldehyde sulfoxylate and an organic hydroperoxide such as cumene or para-menthane hydroperoxide.

Thermally dissociative compounds may also be used as polymerization initiators for this process. Those dissociative initiators which are not capable of oxidizing the aminomercaptans, such as azo compounds, for example, α,α'-azobis-isobutyronitrile and α,α'-azobis(α,γ-dimethyl-valeronitrile), are preferable over dissociative peroxy initiators, such as ammonium persulfate or tertiary butyl-peroxy isobutyrate which are less effective.

The reaction may be carried out in solution. If an emulsifier is employed, a suitable emulsifier is selected. Other components such as buffers (to control the pH) may be used. Suspending agents are used, if desired. These and other components such as coloring agents, etc. may be used in desired amounts.

The temperature will depend upon the initiator used, etc. In the "redox" system, the temperature will generally vary between 0° and 50° C. Using thermally dissociative initiators, the temperature will vary from about 30° to 100° or 120° C., more or less, depending upon the half life of the initiator and the particular monomer system.

2. THE FREE-RADICAL ADDITION REACTION

This procedure is an addition reaction for introducing the age-resisting group into a polymer. It involves the interaction of an arylamino alkyl mercaptan with a polymer containing at least one vinylic double bond or internal double bond per polymer molecule. This interaction is similar to the well-known addition of methyl mercaptan molecules to the olefin units of polydienes to form wholly or partially saturated addition products which contain methyl sulfide substituents. (See the article by Meyer, Tewksbury and Pierson in HIGH POLYMERS, Vol. XIX E. M. Fettes, Ed., Interscience, New York, 1964, Chapter 2, starting on page 133. There are foreign patents relative to the reaction.)

The stereochemical nature of polymers useful in this addition reaction may vary widely and they include polymers made from monomers containing 2 to 20 carbon atoms. They include isotactic, syndiotactic and atactic polydiene homopolymers and copolymers with other conjugated or non-conjugated dienes or vinyl monomers. The method of preparation of such polymers is not important as long as the reactability of at least one olefin unit per polymer molecule is maintained. Polymers applicable include naturally occurring polydienes such as natural rubber, gutta percha, balata as well as those prepared synthetically from monomers. Preparation of such polymer may be initiated thermally, by radiation or by a variety of catalysts including free-radical initiation systems or cationic, anionic or coordination complex catalysts including the Ziegler-Natta type.

Included among the polymeric substrates operative in this process are free-radical polymers prepared from the same monomers or mixtures of monomers which can be used in the previously described chain-transfer process as long as the resultant polymers contain at least one reactable olefin unit per polymer molecule. Also included are polymers of ethylene, propylene or isobutylene containing small amounts of segmers of conjugated or non-conjugated acyclic or cyclic dienes or polyolefins including isoprene, butadiene-1,3; 1-norbornene, and 1,5-cyclooctadiene.

Included among operative polymeric substrates prepared by non-free radical techniques are cis and trans forms of 1,2-polybutadiene or 1,4-polybutadiene as well as syndiotactic or atactic homopolymers or copolymers prepared from butadiene-1,3; cis and trans forms of 3,4-polyisoprene or 1,4-polyisoprene as well as syndiotactic or atactic homopolymers or copolymers prepared from isoprene; analogous preparable homopolymers or copolymers of 2-ethyl-butadiene-1,3; piperylene; 2,3-dimethyl-butadiene; 2-chloro-butadiene-1,3; or 1,3-hexadienes.

Other polymers which may be used as substrates include those prepared by metathesis reactions of cyclo-olefins, cyclo-diolefins, bicyclo-monoolefins and bicyclo-diolefins, mixtures of these with α-olefins or copolymers of these with α-olefins, or norbornene. By the metathesis reaction is meant a polymerization in which the substituents on the olefin carbon atoms of one monomer molecule are interchanged with those of another monomer molecule. Polymers so prepared include polypentenylene, polyoctenylene, or polyoctadienylene.

Polymers prepared by ring opening reactions of certain cyclic olefins such as norbornene by a non-metathesis catalyst such as a cationic or Ziegler-Natta type catalyst may also be used as substrates for this process.

In the interaction of an aminomercaptan with a double bond already present in a polymer, this interaction may be carried out in various ways. The polymeric substrate may be dispersed in an emulsion, suspension or solution. The addition reaction is catalyzed by free-radical initiators, either of the thermally dissociated type or the "redox" type, preferably the former, and including azo compounds such as bis-azoisobutyronitrile and hydroperoxides such as cumene hydroperoxide and p-menthane hydroperoxide. Temperatures necessary for effective additions of the aminomercaptans of this invention to polymeric substrates are those necessary for continuous dissociation of the particular catalyst used, and vary from about 0° C. to about 100° C. The time of reaction required depends upon many factors including the catalyst used, its concentration, the level of mercaptan addition required and for the case of addition to stereospecific polydienes, the acceptable degree of isomerization of polymer configuration.

In the addition reaction the level of aminomercaptan charged may be from 0.1 to 10.0 parts or preferably 0.5 to 5 parts per hundred parts of polymer (p.h.p.), and the level of catalyst, if thermally dissociative, may be from 0.05 to 5, and preferably 0.05 to 1.0 p.h.p. The reaction temperature, using a thermally dissociative catalyst, may be 20° to 120° C., and is preferably 30° to 80° C. The polymer system should be free of appreciable levels of reactable olefinic monomers and of free-radical inhibitors in order to obtain a desired level of mercaptan addition in reasonable time. Such reactions can be carried out in emulsion, suspension or solution media.

3. THE MILLING AND CURING PROCESS

In this process, the aminomercaptan is added to a millable elastomeric diene homopolymer or copolymer on a rubber mill, for example a Banbury, in presence of chemical additives used conventionally for curing or vulcanizing rubber, in the presence of air and at conventional rubber milling temperatures, in the presence or absence of reinforcing pigments. Such rubber stock is then cured in an oven or press at a temperature normally used in the art for production of a vulcanizate, as for example, between 250° F. and 350° F.

Representative polymers and copolymers useful in the process include polybutadiene, polyisoprene, isoprene-styrene, butadiene-styrene, isoprene-acrylonitrile, butadiene-acrylonitrile (referred to herein as elastomers) in which a major portion is butadiene or isoprene. The vulcanizate when extracted with a solvent such as acetone or methyl ethyl ketone in order to free it of non-rubber additives, has a resistance to oxidation or aging very much greater than that of a vulcanizate which has been prepared in the presence of a conventional antioxidant, such as 2,6-di-t-butyl-p-cresol which has been removed from the vulcanizate by extraction. Incorporation of age-resistor functions by this process is illustrated by Example 11. It is therefore evident that the aminomercaptan used is incorporated into such a polymer vulcanizate during the combined milling/curing process.

AGE-RESISTANT POLYMERS

The age-resistant polymers of this invention obtained by the several processes described may be defined by the formula ZSP in which ZS is the aminosulfide group of Formula 1, namely,

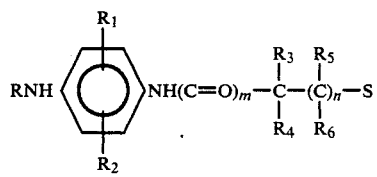

defined above, and P, which has been removed, represents the polymeric portion of the age-resistant polymers referred to herein. Thus, the age-resistant polymers may be represented by the formula

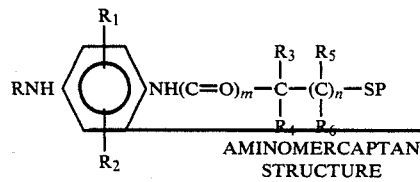

Examples of the preparation of age-resistant polymers by the chain-transfer reaction are Examples 4,5,6 and 7.

Examples of the preparation of age-resistant polymers by the addition reaction are Examples 8 and 9.

Example 10 illustrates the incorporation of age-resistant aminosulfide groups into the polymers by milling and curing.

Example 11 illustrates the use of aminomercaptans of this invention as conventional age resisters.

Examples of the preparation of some of the aminomercaptans useful in this invention, and intermediates used in their preparation, are illustrated by Example 1, 2 and 3.

EXAMPLE 1

N-(4-Anilino-Phenyl)-$\beta$-Mercaptopropionamide

A mixture of 18.4 grams of N-phenyl-p-phenylene diamine, 10.6 grams of $\beta$-mercaptopropionic acid and 120 milliliters of xylene (technical grade) was heated to reflux (about 140° C.) under nitrogen atmosphere, with stirring. A 1.6 milliliter quantity of water (90% of theory) was removed from this mixture by azeotropic distillation through a Vigreux column with the aid of a Dean-Stark trap, during a 13-hour period. A solid product was isolated in 18.7 grams quantity from the reaction mixture by cooling the latter, pouring into hexane, collecting the resultant crystalline product by filtration, washing the crushed crystalline product with more hexane and evaporating to dryness. The product was recrystallized from hot toluene to 17.6 grams (64.5%) of white platelets melting at 98.3°–99.5° C. The resultant new compound, N-(4-anilino-phenyl)beta-mercaptopropionamide, sometimes referred to hereafter as MPDA, had mercaptan assay of 93.8% of theoretical, on the basis of a potentiometric titration with an isopropyl alcohol solution of silver nitrate, following a method described by R. M. Pierson, A. J. Costanza and A. H. Weinstein, J. Polymer Sci., 17, 234 (1955).

In a manner similar to that described above, a series of aminomercaptans were prepared by use of the appropriate diamine and mercapto-acid substrates. They are characterized in Table I. Those products which did not crystallize readily were freed of mercapto-acid substrate by extracting their benzene solutions with aqueous sodium carbonate, and then with water before isolating.

TABLE I

AMINOMERCAPTAN STRUCTURE

RNH—⟨⟩—NHC=O(CH$_2$)$_n$SH

| NO. | R | n | COLOR | STATE OR MELTING POINT, °C. | Sulfur, % Calcd | Sulfur, % Found | Nitrogen, % Calcd | Nitrogen, % Found | RSH, % |
|---|---|---|---|---|---|---|---|---|---|
| I | Phenyl | 1 | White | 135.5–136.5 | 12.4 | 12.3 | 10.8 | 10.8 | 90.1 |
| II | Phenyl | 2 | Silver | 98.3–99.5 | 11.8 | 11.8 | 10.3 | 10.3 | 93.8 |
| III | p-Tolyl | 1 | Brown | 229.0–230.0 | 11.2 | 20.5 | 9.72 | 9.62 | |
| IV | c-Tolyl | 2 | Brown | Syrup | | | | | 71.6 |
| V | p-Anisyl | 2 | Blue-grey | 124–126 | | | | | 73.9 |
| VI | 1,3-Dimethyl-butyl | 1 | Amber | Glass | | | | | 69.6 |
| VII | 1,3-Dimethyl-butyl | 2 | Black | Glass | | | | | 61.7 |

EXAMPLE 2

Alkyl- or Aryl-Substituted-p-Phenylenediamine Substrates

The diamine substrates used for preparation of the aminomercaptans of Table I and the aminomercaptan XIV, whose preparation is described in Example 3, are characterized in Table II. Referring to the examples of Table II, they were either available as the free amine (VIII) or its hydrochloride (XI). Compounds IX and X were prepared from p-nitrochlorobenzene and the appropriate toluidine according to a method described by R. H. Kline, RUBBER CHEM. TECHNOL. 46, 96 (1973). Compound XII was prepared by reductive alkylation of p-amino-acetanilide with methyl isobutyl ketone according to a general procedure discussed by Morris Freifelder in PRACTICAL CATALYTIC HYDROGENATION, Wiley-Interscience, New York, 1971, Ch. 17, page 346.

TABLE II
DIAMINE SUBSTRATES

| NO. | STRUCTURE RNH NH$_2$ in which R = | MELTING POINT, °C. | USED FOR PREPARATION OF AMINO-MERCAPTAN NUMBER: |
|---|---|---|---|
| VIII | Phenyl | 76–77 | I, II, XIV |
| IX | p-Tolyl | 115–116 | III |
| X | o-Tolyl | 58.5 | IV |
| XI | p-Anisyl | 102–103 | V |
| XII | 1,3-Dimethyl-butyl | 43–44 | VI, VII |

EXAMPLE 3

(-(Beta-Mercapto-Beta, Beta-Dimethyl-Ethyl), N'-Phenyl-Para-Phenylenediamine

An intermediate compound, bis-[beta-(4-anilinophenyl-imino)-alpha,alpha-dimethylethyl] disulfide was first prepared as follows:

Following a procedure described for preparation by J. J. D'Amico and W. E. Dahl, J. Org. Chem., 40 1224 (1975), α,α'-dithiobis-isobutyraldehyde, which was freshly prepared as described from isobutyraldehyde and sulfur monochloride, were interacted with two mole equivalents of N-phenyl-p-phenylenediamine (VIII), at ambient temperature, in methanol solvent. The product, obtained in 89 per cent yield, from a water-washed benzene extract of the reaction mixture was a dark-brown uncrystallizable semi-solid form of bis-[beta-(4-anilophenyl-amino)-alpha, alpha-dimethylethyl] disulfide.

This diamino disulfide was reduced to a mercaptan as follows: A solution of 39.2 grams of compound (prepared as above) in 150 milliliters of anhydrous tetrahydrofuran was added dropwise, with stirring, under inert atmosphere, to a refluxing solution of 5.0 grams of lithium aluminum hydride in 200 more milliliters of the same solvent; over a 40-minute period. The reaction mixture was permitted to reflux for several more hours. The conditions used for this reaction and the subsequent product work-up are in accordance with conditions described for preparation of analogous compounds by Corbin and Work, J. Org. Chem. 41, 489 (1976). The excess LiAlH$_4$ was decomposed with aqueous sodium potassium tartrate, and the product isolated from a water-washed diethyl ether extract by vacuum evaporation. In this manner, 37.2 grams of a thick dark-brown syrup, containing 47 percent of mercaptan, namely, N-(beta-mercapto-beta, beta-dimethyl-ethyl),N'-phenyl-para-phenylenediamine, Compound XIV of Table II, having the theoretical molecular weight of 272, was isolated.

EXAMPLE 4

Incorporation of Aminomercaptans into Polystyrene VIA Chain Transfer Reaction

In two separate experiments, 1.00 part by weight of Compounds I or II of Table I, corrected for active mercaptan content, was charged into vials each containing 100 parts of styrene, 0.10 part of bis-azoisobutyronitrile and 5.0 parts of pyridine. In a third vial, the same proportions of all ingredients except aminomercaptan were charged. The vials were sealed under nitrogen atmosphere and tumbled for 16 hours in a water bath at 50° C. Low conversions of polystyrene samples were isolated from each of the three solutions by coagulating into isopropyl alcohol.

On the basis of inherent viscosity determinations made on benzene solutions of dried polystyrene samples, the number average molecular weights were determined for each sample, using an equation developed by F. R. Mayo, J. Am. Chem. Soc. 65, 2324 (1943).

In this way, it was determined that polymer made in the presence of Compound II (MPDA) had a molecular weight of 17,100 as compared with a value of 266,000 for the control polymer. By substituting these molecular weight values into an equation developed by the cited author, a chain transfer constant (T.C.), representing a ratio of reactivity of Compound II over that of a styrene monomer molecule with a polystyrene radical, was calculated. The fact that the T.C. value for Compopund II at 50° C. obtained in this manner was an appreciable value, namely 1.40, indicated that Compound II had reacted appreciably with the polymer by means of an incorporating mechanism. By similar means, it was shown that Compound I (MADA), with a T.C. value of 0.27, had an appreciable, if somewhat lesser, tendency to incorporate into polystyrene.

EXAMPLE 5

Incorporation of MPDA into Isoprene/Styrene Copolymers by Chain Transfer Reaction A series of emulsion copolymerizations A to E were carried out in four-ounce screw-cap bottles using 20.0 grams monomer charges and containing the following ingredients in common, all listed in parts per hundred of monomer:

| Isoprene | 75.0 |
|---|---|
| Styrene | 25.0 |
| Pyridine | 5.00 |
| Potassium stearate | 5.00 |
| Distilled water | 200 |

Variable ingredients were also charged into these bottles, as indicated in Table III on a parts per hundred of monomer basis. Conversion levels obtained, after the bottles were swept with nitrogen, sealed and tumbled for 17 hours in a water bath at the prescribed temperatures, are also recorded in this table.

TABLE III

| VARIABLES | A | B | C | D | E |
|---|---|---|---|---|---|
| Ammonium persulfate | — | 0.40 | 0.40 | — | — |
| Azobis-isobutyronitrile | 0.40 | — | — | 0.40 | 0.40 |
| MPDA[a] | — | 2.00 | 2.00 | — | 2.00 |
| Reaction temperature, °C. | 50 | 50 | 70 | 70 | 70 |
| Conversion to polymer, % | 76 | 0 | 26 | 97 | 80 |

[a]On basis of 100% mercaptan activity.
Efficiency of incorporation of MPDA into isoprene/styrene copolymers A series of copolymers of substantially 75% of isoprene: 25% styrene were prepared as in Example 5, recipe D, with variables indicated in Table IV including MPDA charge levels. Polymers were coagulated into isopropyl alcohol, freed of non-polymeric substances by repeated extractions with hot isopropyl alcohol, and vacuum evaporated.

Levels of 4-anilinophenyl-carbamyl units incorporated into polymers, on a parts per hundred (p.h.r.) basis, were determined on basis of a colorometric assay of the intensity of blue-colored quinone-imine chromophore developed by oxidation of chlorfrom solutions of polymers with benzoyl peroxide.

Thin films of polymers of known weight of from 1 to 1.5 grams were made by evaporating benzene cements of polymers onto tared aluminum sheets having a surface area of 1500 cm². These sheets were inserted into the chambers of a typical oxygen absorption apparatus. Oxidation resistance (O.R.) values for these polymers were determined as the number of hours required for absorption of 1 per cent by weight of oxygen by a polymer sample from oxygen atmosphere at a given temperature, in this case 90° C.

Data relating to efficiency of incorporation of amino groups and to oxidation resistance of these polymers are also included in Table IV. Data shows the marked enhancing effect of incorporated MPDA on polymer oxidation resistance.

TABLE IV

| RECIPE VARIABLES | PARTS BY WEIGHT IN | | | | |
|---|---|---|---|---|---|
|  | F | G | H | J | K |
| MPDA | 1.00 | 2.00 | 3.00 | 2.00 | — |
| n-Dodecyl mercaptan | — | — | — | — | 1.5[a] |
| Pyridine | 5.- | 5.0 | 5.0 | — | 5.0 |
| POLYMERIZATION RESULTS: | | | | | |
| Conversion, % | 87 | 80 | 18 | 94 | 92 |
| P'z'n time, hrs. at 70° C. | 17 | 17 | 17 | 17 | 7 |
| 4-Anilinophenyl-carbamyl units incorporated, p.h.r. | 0.52 | 0.76 | 1.06 | — | — |
| Efficiency of MPDA incorporation[b], % | 52 | 38 | 35 | | |
| O.R. Values at 90° C. | 92 | 520 | 405 | 500 | 8.6 |

[a]Added to insure polymer solubility in benzene.
[b]On basis of parts MPDA charged.

EXAMPLE 6

Incorporation of Other Aminomercaptans into Isoprene/Styrene Copolymers by Chain Transfer Reaction Using the general procedure of Example 5, but substituting for MPDA, 2.00 part quantities of other aminomercaptans characterized in Table I, and adjusting for mercaptan activity, a series of 75.0 isoprene/25.0 styrene mixtures were polymerized for 17 hours at 70° C. Polymers were isolated, worked up and tested in the manner indicated in Example 5. Parameters relating to polymerization and to polymer characteristics are indicated in Table V.

TABLE V

|  | L | M | N | P | Q | R |
|---|---|---|---|---|---|---|
| Aminomercaptan number (see Table I or II) | I | IV | V | VI | VII | XIV[a] |
| Conversion, % | 56 | 53 | 75 | 29 | 99 | 27 |
| P'z'n time, hrs. at 70° C. | 22 | 16 | 21 | 17 | 17 | 16 |
| O.R.[a] values at 90° C. | 95 | 420 | 515 | 380 | 245 | 220 |

[a]Charging only 1.00 pt. of aminomercaptan.
O.R. = Oxidation-Resistance: Determined as in Example 6.

EXAMPLE 7

Incorporation of Aminomercaptans I and II into Butadiene Copolymers Via Chain Transfer Reaction Butadiene mixtures with either acrylonitrile or methyl methacrylate weighing 20.0 grams each were polymerized in four-ounce screw-cap bottles in presence of 1.60 part amounts of aminomercaptans as indicated in Table VI, along with control polymers. Recipes used contained the reduction-oxidation ("redox") type initiator systems indicated in Table VI. Also included in this table are conversion levels of the resultant polymers and their oxidation resistant values after removal of non-polymeric substances by extraction.

TABLE VI

| INGREDIENTS: | PARTS BY WEIGHT IN: | | | | |
|---|---|---|---|---|---|
|  | T | U | V | W | X |
| Butadiene | 67.0 | 67.0 | 67.0 | 80.0 | 80.0 |
| Acrylonitrile | 33.0 | 33.0 | 33.0 | — | — |
| Methyl methacrylate | — | — | — | 20.0 | 20.0 |
| Tetiary dodecyl mercaptan | — | — | 0.8 | — | 0.5 |
| MADA (I)[a] | 1.60 | — | — | — | — |
| MPDA (II)[a] | — | 1.60 | — | 1.60 | — |
| Potassium stearate | 5.00 | 5.00 | 5.00 | — | — |
| Trisodium phosphate | 0.20 | 0.20 | 0.20 | — | — |
| Sodium linear alkyl sulfonate | — | — | — | 5.00 | 5.00 |
| Water | 200 | 200 | 200 | 200 | 200 |
| FeSO₄.7H₂O | 0.042 | 0.042 | 0.042 | 0.042 | 0.042 |
| Iron chelating agent[b] | 0.17 | 0.17 | 0.17 | 0.17 | 0.17 |
| Sodium formaldehyde sulfoxylate | 0.04 | 0.04 | 0.04 | 0.04 | 0.04 |
| Cumene hydroperoxide | 0.24 | 0.24 | 0.24 | 0.24 | 0.24 |
| Conversion, % | 99 | 95 | 99 | 61 | 99 |
| O.R. values at 100° C., hours | 390 | 385 | 1 | 695 | 5.9 |

[a]Adjusted upward for 100% mercaptan activity.
[b]Active parts of a 34% aqueous solution of a 90/10 mixture of a tetrasodium salt of ethylenediamine tetracetic acid and the monosodium salt of N,N-di-(alpha-hydroxyethyl) glycine, sold as "Versene Fe III".

The last two ingredients charged into each bottle were the butadiene and the cumene hydroperoxide. The bottles were prechilled to 0° C. before adding the butadiene, swept free of air by venting the excess of this monomer, and each was sealed with a screw-cap lined with self-sealing rubber and Teflon gaskets. The hydroperoxide was then added through the cap by use of a hypodermic syringe. The bottles were then tumbled in a water bath at 10° C. for 16 hours. Polymer latices were coagulated into isopropyl alcohol, and the resultant coagula freed of non-polymeric material by repeated extractions with hot isopropyl alcohol. The copolymers were evaporated to dryness in vacuum, and tested for resistance to oxidation as in EXAMPLE 7, casting nitrile copolymer films from methyl ethyl ketone and the acrylic ester copolymer films from benzene. In this instance, the oxidation resistance value determination was done at 100° C.

Results, as indicated in Table VI, show that the resistance to oxidation of butadiene acrylonitrile copolymers were greatly enhanced relative to a control, by incorporation of antioxidant groups by the use of either aminomercaptan I (MADA) or II (MPDA) and that oxidation resistance of a butadiene/methyl methacrylate copolymer was greatly enhanced over that of a control by similar incorporation of MPDA.

EXAMPLE 8

Incorporation of Aminomercaptans into Polybutadiene by Addition in Emulsion

A polybutadiene latex was prepared by polymerizing butadiene in an 8-ounce screw-cap bottle for 16 hours at 50° C. using the recipe indicated in TABLE VII.

TABLE VII

| INGREDIENTS | PARTS BY WEIGHT |
|---|---|
| Butadiene | 100 |
| Tertiary dodecyl mercaptan | 0.50 |
| $K_2S_2O_8$ | 0.10 |
| Potassium stearate | 5.0 |
| Water | 200 |

The resultant latex was stripped of residual butadiene monomer by gently distilling, under nitrogen atmosphere, until no foaming occurred and a few droplets of water condensed.

Two 8-ounce screw-cap bottles were each charged with 72.7 gram quantities of this latex (23.9% solids) containing 20.0 grams of rubber. To each was added 0.25 parts of azobis-isobutyronitrile per hundred of rubber (p.h.r.). One was charged with 2.00 parts of MADA, the other with 2.00 parts of MPDA, both adjusted to 100% mercaptan activity. Bottles were purged with nitrogen, sealed and tumbled for 16 hours in a water bath at 50° C.

These latices as well as a sample of untreated polybutadiene latex were coagulated into isopropyl alcohol, extracted free of nonpolymeric additives, dried and tested for oxidation resistance at 90° C. in the manner described in EXAMPLE 6. On the basis of results indicated in TABLE VIII, it is seen that a considerable degree of intrinsic oxidation resistance has been incorporated into polybutadiene by the use of either MADA or MPDA in this process.

TABLE VIII

| POLYMERS | O.R. VALUES AT 90° C., HRS |
|---|---|
| Polybutadiene control | 7.3 |
| Polybutadiene treated with 2.00 parts MADA | 62 |
| Polybutadiene treated with 2.00 parts MPDA | 58 |

EXAMPLE 9

Addition of Aminomercaptans to Unsaturated Hydrocabon Polymers in Solution

Samples of cis-1,4-polybutadiene; cis-1,4-polyisoprene; and 1,5-polypentenylene, all of which were free of antioxidants and of free radical inhibitors were dissolved in benzene and treated with 2.00 parts of an aminomercaptan in presence of azobis-isobutyro-nitile (AIBN) catalyst under nitrogen atomosphere at 70° C. under conditions indicated in Table IX. Polymers were coagulated into isopropyl alcohol, freed of non-polymeric materials and tested for oxidation resistance at 90° C., along with control polymers, in the manner described in Example 7, with different aminomercaptans identified in Tables I and II.

TABLE IX

| SUBSTRATE SOLUTION | AMINO MER-CAPTAN | REACTION CONDITIONS | | O.R. VALUES AT 90° C. HRS |
|---|---|---|---|---|
| | | AIBN p.h.r. | TIME HRS | |
| cis-1,4-polybutadiene[a] | — | — | — | 9 |
| cis-1,4-polybutadiene | MADA | 0.40 | 41 | 445 |
| cis-1,4-polybutadiene | MPDA | 0.20 | 64 | 435 |
| cis-1,4-polybutadiene[b] | IV | 0.25 | 64 | 380 |
| cis-1,4-polybutadiene | V | 0.25 | 64 | 60 |
| cis-1,4-polybutadiene | VI | 0.25 | 64 | 62 |
| cis-1,4-polybutadiene | VII | 0.25 | 64 | 62 |
| cis-1,4-polybutadiene | XIV[f] | 0.25 | 64 | 380 |
| cis-1,4-polyisoprene[c] | — | — | — | 0.25 |
| cis-1,4-polyisoprene | MPDA[d] | 0.25 | 46 | 18 |
| 1,5-polypentenylene[e] | — | — | — | 63 |
| 1,5-polypentenylene[e] | MPDA | 0.40 | 64 | 81 |

[a]A 5.00% benzene solution of a polymer having 97% cis-1,4-structure.
[b]A solution of 100 parts of the same polymer in a mixture of 295 parts hexane and 585 parts benzene.
[c]A 5.00% benzene solution of a polymer having 96% cis-1,4-structure.
[d]Using 4.00 parts of this compound.
[e]A 5.00% benzene solution of a polymer made by polymerizing cyclopentene with a typical metathesis catalyst.
[f]Described in Example 3.

On the basis of results indicated in Table IX, it may be seen that the intrinsic resistance of the polymeric substrates were considerably enhanced by interaction with an aminomercaptan.

EXAMPLE 10

Incorporation of MPDA into Butadiene/Styrene Copolymer During Milling and Curing A commercial butadiene/styrene copolymer-SBR 1502 (containing 23.5% bound styrene), protected with 1.25 parts of the non-staining phenolic antioxidant Wingstay T, (product of the Goodyear Tire and Rubber Company) was compounded on a mill with the ingredients listed in Table X.

TABLE X

| INGREDIENTS | PARTS BY WEIGHT |
|---|---|
| SBR 1502 | 100 |
| Zinc oxide | 15.0 |
| $TiO_2$ | 30.0 |
| $CacO_3$ | 24.0 |
| Sulfur | 2.00 |
| 2-Benzothiazolyl, N-morpholinyl disulfide | 1.00 |
| MPDA | 2.00 |

The polymer was pressed into an 0.020 inch sheet and cured for 45 minutes at 300° F. or to 90 per cent of optimum cure based on Monsanto rheometer data. A control polymer, oompounded similarly in absence of MPDA was pressed into a similar sheet which was cured for 30 minutes at 300° F. to the same cure level.

A series of one-inch strips was cut from each white vulcanizate. Some were extracted repeatedly with 80/20 benzene/ethanol mixture at ambient temperature over a 2-week period and then dried. Times for extracted strips to absorb 1% by weight of oxygen at 100° C. were compared with times required by non-extracted strips.

It may be seen on the basis of data recorded in TABLE XI that whereas the control SBR vulcanizate loses most of its resistance to oxidation by extraction of the antioxidant Wingstay T, that the SBR vulcanizate milled and cured in presence of MPDA retains a very large percentage of its originally higher resistance to oxidation after extraction because of the chemical incorporation of some of the MPDA into the vulcanizate.

TABLE XI

| VULCANIZATE | O.R. VALUES AT 100° C.; HRS | |
|---|---|---|
| | UNEXTRACTED | EXTRACTED |
| SBR-1502 Control | 95 | 9 |
| SBR-1502 compounded with MPDA | 250 | 170 |

EXAMPLE 11

Aminomercaptans as Conventional Antioxidants for Butadiene/Styrene Copolymer A butadiene/styrene copolymer was prepared by the method used for preparation of SBR-1006. The latex was shortstopped at 70% conversion but was not protected with commercial antioxidants. The latex was coagulated with isopropyl alcohol, extracted free of non-polymeric substances with hot isopropyl alcohol and vacuum evaporated. A 3% solution of copolymer in benzene was prepared. Batches of this cement were charged with 2.00 levels of different aminomercaptans. Oxidation resistance of films made from these cement batches was determined at 100° C. Such values are indicated in Table XII and compared with controls. The structures of the aminomercaptans are referred to in Table XII by Roman numerals indentified in Tables I or II.

It may be seen from Table XII that all of the aminomercaptans I, II, VII and XIV, when uniformly distributed in small quantity in SBR, not containing any other antioxidant, considerably enhance the oxidation resistance of this polymer in the same manner that the commercial antioxidant Wingstay-L does when distributed in the same manner.

TABLE XII

| AMINOMERCAPTAN CHARGED | O.R. VALUES AT 100° C., HRS. |
|---|---|
| None | 0.5 |
| I | 415 |
| II | 415 |
| VII | 450 |
| XIV | 180 |
| 1.00 part of Wingstay-L[a] | 300–350 |

[a] A hindered phenolic antioxidant product of The Goodyear Tire and Rubber Company.

Aminomercaptans described herein, some of which are novel compounds, serve as antioxidants to stabilize polymers against aging when distributed throughout a polymer by conventional techniques as by addition to a polymer cement or latex, by blending into a solid polymer on a mill or Banbury, or by mixing with a liquid polymer or solid polymer powder. Such aminomercaptans include:

N-(4-anilino-phenyl)-α-mercaptoacetamide,
N-(4-anilino-phenyl)-β-mercaptopropionamide,
N-[4-(α',γ'-dimethyl-butylamino)-phenyl]-β-mercaptopropionamide and
N-(β-mercapto-β,β-dimethyl-ethyl), N'-phenyl-p-phenylene diamine All of the compounds except the first are considered to be new compounds. They have antioxidant properties. The last of the compounds has some antiozonant properties as well.

I claim:

1. A process for producing a polymer self-resistant to aging by an addition reaction, which process comprises interacting a polymeric substrate containing at least one reactable double bond per polymer molecule with from 0.1 to 10 parts by weight of an aminomercaptan selected from the group consisting of N-(4-anilino-phenyl)-β-mercaptopropionamide and N-(4-anilino-phenyl)-α-mercaptoacetamide in the presence of a free radical catalyst, wherein the polymeric substrate is polybutadiene.

2. A process for producing a polymer self-resistant to aging by an addition reaction, which process comprises interacting a polymeric substrate containing at least one reactable double bond per polymer molecule with from 0.1 to 10 parts by weight of an aminomercaptan selected from the group consisting of N-(4-anilino-phenyl)-β-mercaptopropionamide and N-(4-anilino-phenyl)-α-mercaptoacetamide in the presence of a free radical catalyst, wherein the polymeric substrate is polyisoprene.

3. A process for producing a polymer self-resistant to aging by an addition reaction, which process comprises interacting a polymeric substrate containing at least one reactable double bond per polymer molecule with from 0.1 to 10 parts by weight of an aminomercaptan selected from the group consisting of N-(4-anilino-phenyl)-β-mercaptopropionamide and N-(4-anilino-phenyl)-α-mercaptoacetamide in the presence of a free radical catalyst, wherein the polymeric substrate is a butadiene-styrene copolymer.

4. A process as specified in claim 1 wherein the aminomercaptan is N-(4-anilino-phenyl)-α-mercaptopropionamide.

5. A process as specified in claim 2 wherein the aminomercaptan is N-(4-anilino-phenyl)-α-mercaptopropionamide.

6. A process as specified in claim 3 wherein the aminomercaptan is N-(4-anilino-phenyl)-α-mercaptopropionamide.

7. A process as specified in claim 1 wherein from about 0.5 to 5 parts by weight of the aminomercaptan is utilized.

8. A process as specified in claim 2 wherein from about 0.5 to 5 parts by weight of the aminomercaptan is utilized.

9. A process as specified in claim 3 wherein from about 0.5 to 5 parts by weight of the aminomercaptan is utilized.

* * * * *